United States Patent [19]

Fischer et al.

[11] 4,143,097

[45] Mar. 6, 1979

[54] PROCESS FOR THE MANUFACTURE OF VINYL CHLORIDE POLYMERS

[75] Inventors: Edgar Fischer, Frankfurt am Main; Johannes Brandrup, Wiesbaden; Jürgen Weinlich, Burgkirchen, Alz, all of Fed. Rep. of Germany

[73] Assignee: Hoechst Aktiengesellschaft, Frankfurt am Main, Fed. Rep. of Germany

[21] Appl. No.: 872,155

[22] Filed: Jan. 25, 1978

[30] Foreign Application Priority Data

Jan. 27, 1977 [DE] Fed. Rep. of Germany ....... 2703280

[51] Int. Cl.$^2$ .................... C08F 14/06; C08L 27/06
[52] U.S. Cl. .................... 260/884; 260/302 F; 526/62; 526/205; 526/330; 526/344; 422/131
[58] Field of Search .................... 526/62, 205; 260/884

[56] References Cited

U.S. PATENT DOCUMENTS

| | | | |
|---|---|---|---|
| 3,836,377 | 9/1974 | Delahunty | 526/205 |
| 3,959,235 | 5/1976 | Nishigaki et al. | 526/62 |
| 3,997,707 | 12/1976 | Aruga et al. | 526/62 |

*Primary Examiner*—Harry Wong, Jr.
*Attorney, Agent, or Firm*—Curtis, Morris & Safford

[57] ABSTRACT

There is provided a process for the manufacture of vinyl chloride homopolymers, copolymers or graft polymers by carrying out the polymerization in a reactor the inner parts and inserts of which are coated with a coating consisting of defined hydrazine derivatives and, preferably, a film-forming material as carrier substance.

7 Claims, No Drawings

PROCESS FOR THE MANUFACTURE OF VINYL CHLORIDE POLYMERS

In the manufacture of vinyl chloride polymers by polymerization in an aqueous medium, polymer deposits are formed on the inner walls of the polymerization autoclave and on the inserted devices. These deposits reduce the polymer yield and deteriorate the quality of the product, because part of these deposits coming off from the walls contaminate the final product by causing specks or fish-eyes.

Removal of such deposits is therefore absolutely required, which is usually carried out by mechanical means. Generally, pressurized water operated spray devices are employed for this purpose, which devices, however, remove the slightly adhering deposits only. Therefore, after every few batches, the reactor has to be cleaned manually with the trowel, and expensive safety measures have to be taken to protect the workers, so that these cleaning operations require much expenditure, cause long times of inoperation of the reactor and thus reduce considerably the profitability of the manufacturing process.

Attempts have therefore been made to suppress or even avoid from the start such polymer deposits during the manufacture of vinyl chloride polymers in aqueous dispersion. A satisfactory solution of the problem, however, has not been found hitherto.

Some of the numerous processes described are based on the principle of reducing the formation of deposits by technological means; for example, scraping the walls of the reactor with a correspondingly shaped agitator; adjusting the wall temperature to at least the temperature of the reaction medium; cooling the reactor wall to $-15°$ to $0°$ C.; feeding aqueous solutions, for example of salts of permanganic, chromic or dichromic acid, in the interface between the liquid and gaseous phases during the polymerization; polymerization while passing an electric current through the liquid reaction medium.

In other known processes, the components of the polymerization recipe are altered and/or futher substances are added to the polymerization liquor.

Further known processes provide reactors with specially designed or coated inner walls in order to suppress the formation of deposits, for example walls having a roughness depth of less than 10 μm, in addition to the use of water-soluble, reducing inorganic salts and adjustment of defined agitator speeds; or an insoluble wall coating of a cross-linked polymer material containing polar groups, which has been prepared using an aldehyde as cross-linking component; or a wall coating consisting substantially of polyethylene-imine hardened by means of an urea, aldehyde or diisocyanate, while optionally adding a bivalent tin salt of an inorganic acid as inhibitor to the polymerization medium; or a uniform wall coating containing at least one polar organic nitrogen, sulfur or oxygen compound of an anionic or nonionic wetting agent, an organic dyestuff or an inorganic pigment. There have been described furthermore wall coatings or polyaromatic amines.

None of these known processes for reducing or preventing deposits in the polymerization reactor is fully satisfactory, because each of these processes has one or more of the following disadvantages:

insufficient prevention of deposit formation;
prolonged polymerization time, reduced yield;
contamination of the polymer by clouding or dyeing substances and particles of the deposit on the walls which have altered due to the influence of heat and cannot be decomposed but with great difficulty;
use of the physiologically intolerable substances;
undesirable alteration of the processing properties of the polymer (enlarged grain size, reduction of heat resistance);
deteriorated activity on copolymerization and on use of certain initiators;
necessity of expensive surface shaping or pretreatment such as polishing;
insufficient reproducibility and limited modification possibilities of formulation and operations mode;
more or less heavy influence of flow conditions on the processes; places of high turbulence being especially critical, therefore necessity of constantly renewed search for optimum conditions with each change of scale and proportions;
special protection measures required for those reactor parts which are not in contact with the liquor, for example special spraying of dome and tubes;
waste water problems due to additives to the liquor.

It is thereforean object of the present invention to provide a process for the manufacture of vinyl chloride polymers which is free from the above disadvantages and which is superior to the hitherto known processes with respect to the combined items as cited above. A special object of this invention is to use in this process such deposit-preventing substances which are physiologically tolerable according to the actual state of scientific knowledge, or which are introduced into the polymerization liquor and the polymer in a physiologically tolerable concentration only. Another object of this invention is to provide a process the deposit-preventing effect of which is of long duration and sufficient also in the case of copolymerization of vinyl chloride.

These and further objects are achieved in accordance with this invention by carrying out the polymerization in a reactor the inner parts and inserts of which are coated with a coating consisting of defined hydrazine derivatives and, perferably, a film-forming material as carrier substance.

In accordance with this invention, there is provided a process for the manufacture of vinyl chloride homopolymers, copolymers or graft polymers containing at least 50% by weight of polymerized vinyl chloride units by polymerization of the monomer or the monomer mixture in aqueous dispersion in the presence of radical-forming catalysts, optionally suspension stabilizers, emulsifiers and further polymerization auxiliaries, which comprises carrying out the polymerization in a reactor the inner walls of which and other parts where polymer deposits may form are coated entirely or partially with a coating containing a compound of the formula

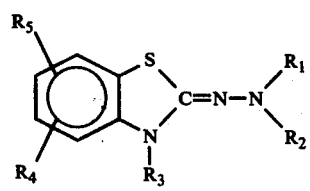

(I)

in which $R_1$ is hydrogen, an organic hydrocarbon radical having from 1 to 12 carbon atoms, or acyl having from 2 to 8 carbon atoms, $R_2$ is $R_1$ or $R_2$ and $R_1$ together are alkylidene or aralkylidene, $R_3$ is hydrogen or an organic hydrocarbon radical having from 1 to 12 carbon atoms; one at least of the radicals $R_1$, $R_2$ or $R_3$ being hydrogen, $R_4$ is $R_3$; furthermore an O-organic hydrocarbon radical having from 1 to 12 carbon atoms, hydroxyl, halogen, amino, (di)alkylamino having from 1 to 12 carbon atoms, carboxyl, sulfoxyl ($=$ SO$_3$H);

$R_5$ is $R_4$, or $R_4$ and $R_5$ together are an aromatic ring.

This invention provides furthermore a polymerization vessel the inner walls of which and other parts where polymer deposits may form are coated partially or totally with the above coating system.

Furthermore, the invention provides compounds of the following formula (II):

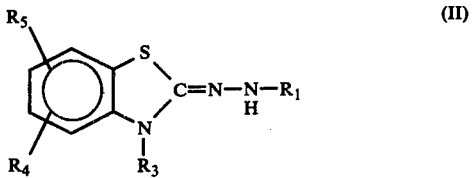

(II)

in which $R_1$ is acyl having from 2 to 8, preferably 2 to 5, carbon atoms, and $R_3$ to $R_5$ are as defined above according to formula (I).

Apart from their use as deposit-preventing agents, on account of their complex-forming properties, these compounds may be used advantageously also in the fields of protection from corrosion, galvanotechnics and as polymerization inhibitors.

In the above formulae (I) and (II) (in the latter case only with respect to the radicals $R_3$ to $R_5$) of the coating substance in accordance with the present invention, the symbols have preferably the following meanings:

$R_1$ and/or $R_2$: hydrogen, a hydrocarbon radical of aliphatic character (alkyl, cycloalkyl, aralkyl) having from 1 to 12 carbon atoms, especially a linear or branched alkyl radical having from 1 to 6 carbon atoms, for example methyl, ethyl, propyl, butyl, i-butyl, n-hexyl; an aliphatic acyl radical having from 2 to 5 carbon atoms, such as acetyl, propionyl, or an aromatic acyl radical having 7 or 8 carbon atoms such as benzoyl;

$R_1$ and $R_2$ together: alkylidene having from 1 to 6 carbon atoms, such as methylene, ethylene; aralkylidene having from 7 to 10 carbon atoms, such as benzylidene;

$R_3$ is hydrogen, a hydrocarbon radical of aliphatic character (alkyl, cycloalkyl, aralkyl) having from 1 to 12 carbon atoms, especially a linear or branched alkyl radical having from 1 to 6 carbon atoms, for example methyl, ethyl, propyl, butyl, i-butyl or n-hexyl;

$R_4$ is $R_3$; furthermore alkoxy having from 1 to 6 carbon atoms, such as methoxy, ethoxy, propoxy, hydroxyl, fluorine, chlorine, dialkylamino;

$R_5$ is $R_4$ or $R_4$ and $R_5$ together are an aromatic ring having from 6 to 10 carbon atoms, especially a benzene ring optionally substituted by one or more functional groups as cited sub $R_3/R_4$.

As indicated in the formula, the radicals $R_4$ and $R_5$ may be in any position at the benzene ring, preferably, however, they are in o- or p-position to each other. Examples of combinations of $R_4$ and $R_5$ according to this invention are the following (alkyl and alkoxy hereinafter being radicals having from 1 to 6 carbon atoms): 4,5-dialkyl, 4,6-dialkyl, 5,6-dialkyl 6,7-dialkyl, 5,7-dialkyl, 4(5)-alkyl-5(4)-alkoxy 4(6)-alkyl-6(4)-alkoxy, 5(6)-alkyl-6(5)-alkoxy, 6(7)-alkyl-7(6)-alkoxy, 4(5)-alkyl-5(4)-chloro, 4(6)-alkyl-6(4)-chloro, 5(6)-alkyl-6(5)-chloro, 6(7)-alkyl-7(6)-chloro, 4(6)-alkyl-6(4)-hydroxy(amino), 4(5)-hydroxy(amino)-5(4)-alkyl, 4(6)-alkyl-6(4)-(di)alkylamino, 4(6)-hydroxy-6(4)-amino, 4(6)-hydroxy-6(4)-(di)alkylamino, 4(5)-alkyl-5(4)-carboxyl(sulfoxyl), 5(6)-alkyl-6(5)-carboxyl(sulfoxyl), 6(7)-alkyl-7(6)-carboxyl(sulfoxyl), 4(6)-hydroxy-6(4)-carboxyl(sulfoxyl), 6(7)-hydroxy-7(6)-carboxyl(sulfoxyl).

Preferred in accordance with this invention are compounds of the above formula (I) in which two of the radicals $R_1$, $R_2$ and $R_3$ are hydrogen, and especially those compounds where all three of these radicals are hydrogen, and compounds of the formula (II), in which the radicals $R_3$ to $R_5$ are hydrogen.

Typical representatives of compounds of the above formulae are the following:

benzothiazol-2-one-hydrazone, 1-methylbenzothiazol-2-one-hydrazone, 1-butylbenzothiazol-2-one-hydrazone, 1-ethyl-5-methoxybenzothiazol-2-one-hydrazone, naphtho-thiazol-2-one-hydrazone, 1-ethyl-5-chloro-benzothiazol-2-one-hydrazone, 1,6-dimethyl-benzo-thiazol-2-one-hydrazone, 1-propyl-4-chloro-benzothiazol-2-one-hydrazone, 1-methyl-4-hydroxy-benzothiazol-2-one-hydrazone, 1-methyl-7-carboxy-benzothiazol-2-one-hydrazone, 1-methyl-4-methyl-6-hydroxy-benzothiazol-2-one-hydrazone, 4-methyl-benzothiazol-2-one-hydrazone, 5-methyl-benzothiazol-2-one-hydrazone, 6-methyl-benzothiazol-2-one-hydrazone, 7-methyl-benzothiazol-2-one-hydrazone, 5-n-hexylbenzothiazol-2-one-hydrazone, 4,5-dimethylbenzothiazol-2-one-hydrazone, 6,7-dimethylbenzothiazol-2-one-hydrazone, 5-methoxybenzothiazol-2-one-hydrazone, 5-chloro-benzothiazol-2-one-hydrazone, 7-chloro-benzothiazol-2-one-hydrazone, 4-hydroxy-benzothiazol-2-one-hydrazone, 6-hydroxy-benzothiazol-2-one-hydrazone, 4-dimethylamino-benzothiazol-2-one-hydrazone, dimethylamino-benzothiazol-2-one-hydrazone, 5-carboxy-benzothiazol-2-one-hydrazone, 7-carboxy-benzothiazol-2-one-hydrazone, 5-sulfoxy-benzothiazol-2-one-hydrazone, 7-sulfoxy-benzothiazol-2-one-hydrazone, 4-methyl-6-hydroxy-benzothiazol-2-one-hydrazone, 4-methyl-6-dimethylamino-benzothiazol-2-one-hydrazone, 4-methyl-6-carboxy-benzothiazol-2-one-hydrazone, 4-methyl-7-carboxy-benzothiazol-2-one-hydrazone, 4-methyl-7-sulfoxy-benzothiazol-2-one-hydrazone, 4-chloro-7-carboxy-benzothiazol-2-one-hydrazone, 4-hydroxy-7-carboxy-benzothiazol-2-one-hydrazone, 5-carboxy-6-hydroxy-benzothiazol-2-one-hydrazone, benzothiazol-2-one-β-acetylhydrazone, benzothiazol-2-one-β-propionylhydrazone, 4(5)-methyl-benzothiazol-2-one-β-propionylhydrazone, 4(6)-methyl-6(4)-hydroxy-benzothiazol-2-one-β-acetylhydrazone, 4(5)-methoxy-benzothiazol-2-one-β-acetylhydrazone, benzothiazol- 2-one-benzalazine, benzothiazol-2-one-2'-oxy-benzal-azine, benzothiazol-2-one-β-methylhydrazone.

The coating substance in accordance with this invention may be considered as being a hydrazine derivative, as shown in the above formula. Because of the fact that compounds in which the hydrazine radical of said formula is replaced by oxygen or the NH group have practically no deposit-preventing action, and on account of further observations, it may be concluded that the active group of the compounds of the aforesaid formula has the following structure:

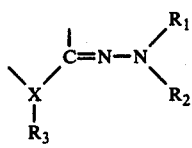

wherein the radicals $R_1$ to $R_3$ are as defined above.

Of course, according to this invention the coating substances as defined above may be used also in the form of mixtures with each other.

Furthermore, the substances in accordance with this invention may be combined with known deposit-suppressing materials, for example compounds having azine or thiazine rings such as methylene blue, organic dyestuffs such as nigrosine black or aniline black, inorganic pigments as described in German Offenlegungsschrift No. 2,044,259, polymer imines according to German Offenlegungsschrift No. 2,357,867, or polyaromatic amines as disclosed in German Offenlegungsschrift No. 2,541,010.

Furthermore, the substance according to this invention may be used in combination with halides, hydroxides, oxides and carboxylates or any metal element according to German Offenlegungsschrift No. 2,557,788, especially tin-II salt; whereby complexes of active substance and additive may be formed in situ. In certain cases, such metal complexes with the active substance in accordance with this invention may be used from the start, for example complexes with copper, silver, zinc, tin, molybdenum, iron, cobalt, or nickel ions, as described in German Offenlegungsschrift No. 2,548,424.

Further additives may be for example antifoaming agents, antioxidants, wetting agents a.s.o.

The above additives are used above all in the case where a cross-linking substance or a mixture of such substances is used as carrier material, because this causes an especially efficient fixing on the surface to be coated, and because in the case of physiologically critical additives there is nearly no risk that they are introduced in a dangerous concentration into the polymerization liquor or the polymer.

The coating substances of the invention are prepared according to known methods, for example by reaction of 2-halogeno (especially chloro or bromo)-, or 2-thio-benzothiazoles, optionally correspondingly substituted at the benzene nucleus, with hydrazine or correspondingly substituted derivatives thereof. Especially in the case of the acyl compounds of formula (II), the benzothiazol-2-one-hydrazone so obtained and optionally substituted at the benzene nucleus is acylated in known manner, for example by reaction with the corresponding acid anhydride. This reaction may be carried out for example in a solvent not hindering the acylation (preferably the corresponding acid itself), at elevated temperatures, for example at about 75°–110° C.

By "coating" there are to be understood those coatings or surface coverings which are formed by bringing into contact a solution or dispersion of the active substance with the specific inner parts of the reactor, for example by spraying, bathing a.s.o.

The substance of the invention may therefore be applied onto the surfaces to be coated in such a manner that first a coating solution of suitable viscosity is prepared for example in one of the optionally water-containing solvents as described below, and that this solution is then applied in a suitable manner. After drying, optionally with heating, a corresponding coating forms. The coating may be repeated several times, in order to obtain a safe and pore-free covering.

This application mode may be chosen above all in the case where the coating substance has a corresponding affinity to metal surfaces, for example when it contains hydroxy groups.

Preferably, however, fixing of the active substance is carried out in such a manner that first an additional film-forming, preferably cross-linking, carrier substance is used; in the latter case the active substance of the invention may act in part or optionally in total as cross-linking component. The chemical bond so obtained causes an especially good fixation of the active substance in the coating, so that there is no risk of it being washed off. When carrier substances having no cross-linking action are used, the risk of washing-off may be overcome to a certain extent by adding furthermore a small amount of the active substance, for example from 1 to 100 ppm (relative to the weight of the monomer or monomer mixture), to the polymerization liquor.

Suitable film-forming carrier materials are in principle all lacquer systems ensuring the formation of a coating after hardening, which is sufficiently resistant to the polymer liquor and to the monomer(s); that is, which shows no signs of dissolving or swelling even after several polymerizations.

Examples of such film-forming carrier materials are the following:
conventional lacquers, cellulose derivatives, polyvinyl acetate, polystyrene, polyvinyl chloride. Suitable solvents or dispersing agents are conventional solvents, for example lower alcohols such as methanol, ethanol, m- or i-propanol, n- or i-butanol, ether alcohols such as monomethylglycol ether, ketones such as acetone, cyclohexanone, esters such as ethyl acetate, butyl acetate, chlorinated hydrocarbons such as methylene chloride, carbon tetrachloride, trichloroethane, trichloroethylene, aromatic substances such as benzene, toluene, xylene, dimethyl formamide, dimethyl acetamide, acetonitrile, or even water. Corresponding mixtures may also be used.

As already mentioned, there are used preferably so-called reactive systems, that is, cross-linking materials, as carrier materials in accordance with this invention, such as shellac, alkyd resins, and especially bicomponent or multicomponent systems on the basis of isocyanate/aldehyde or phenol/aldehyde, or especially on the basis of epoxide or anhydride.

Reactive systems on the basis of epoxide are for example those derived from multiaromatic or aliphatic glycidyl ethers, such as bisphenol A, diglycidyl ether or butanediol-diglycidyl ether, copolymers or acrylic acid or methacrylic acid-glycidyl ester or maleic acid-glycidyl ester or purely aliphatic epoxides such as vinylcyclohexene-diepoxide. Alternatively, combinations of epoxides with isocyanate or phenol/formaldehyde systems may be used.

The epoxy group containing polymers or copolymers have advantageously a polymerization degree of from 10 to 500, preferably 20 to 250. Suitable comonomers are vinyl acetate, vinylalkyl ether or allyl acetate. Styrene and (meth)acrylic acid ester and maleic acid ester may also be used. Advantageously, 2 epoxy groups should be present per molecule of the polymer or copolymer, and preferably from 10 to 25 mol % of the components of the polymer or copolymer should have epoxy groups.

Examples of cross-linking materials on the basis of anhydride are 1:1 copolymers of maleic anhydride especially with vinylalkyl ether, vinyl acetate or allylacetate. The polymerization degree of these products should be normally from 50 to 1000.

Resin components on the basis of isocyanate are derived for example from hexamethylene- or toluylene-diisocyanate. Such compounds are known in polyurethane chemistry.

Suitable solvents for the resin components on the basis of epoxides are in principle the same as those already mentioned above for the non-cross-linking carrier materials, especially monoethers of glycol such as monomethyl- or monoethylglycol ether.

Suitable solvents for the resin components on the basis of anhydrides are especially aprotic solvents such as acetone, methylethylene-ketone, cyclohexanone, dioxan, tetrahydrofuran, dioxolan, dimethyl formamide, dimethyl sulfoxide, glycol-dimethyl ether, diglycol-dimethyl ether or mixtures of these solvents.

The reactive systems may be hardened by addition of so-called hardeners. However, in the case of some systems, the active substance of the invention may act as hardener either partially or entirely. In other cases, hardening may be obtained by a heat treatment only.

Because of the particularly favorable processing conditions at high reactivity, suitable hardeners are especially the basic amine type systems, for example ethylene diamines, diethylene triamines, triethylene tetramines or xylylene diamines. Reaction products of these amines with phenol and formaldehyde have an especially favorable behavior. Furthermore, there may be used corresponding amine/epoxide resin adducts or adducts of polyols and polyisocyanates.

As already mentioned, the active substance of the invention may act in principle as hardener component because of the amine groups contained therein.

In the case of epoxide systems, however, this is generally impossible because of the high reactivity degree of these systems; which means that the presence of a hardener is required in addition, otherwise the deposit-preventing function of the active substance would be deteriorated or even completely neutralized because of the essential active group being blocked. Of course, this risk is the greater the smaller the amount of active substance is used in the reaction system, and the less hydrogen atoms are present at the corresponding nitrogen atoms according to the above formula. The optimum hardener amount which depends among others on the reactivity of the hardener as compared to the active substance may be easily evaluated in a few small-scale tests; generally, from 0.8 to 1.2, preferably from 0.9 to 1.0 amine hydrogen per epoxide group should be present; 1 to 100%, preferably 1 to 10%, of which may be furnished by the active substance. Generally, the reactivity of the hardener should be considerably above that of the active substance, in order to incorporate it into the carrier but not to block it.

In the case of anhydride systems, however, the active substance alone may serve as hardener, because these anhydride systems are less reactive and cannot block totally all active groups. On the other hand, especially when employing small amounts of active substance, the additional use of a hardener is recommended, otherwise there would be the risk of incomplete hardening, and an insufficient deposit-suppressing effect would be the result.

The coating is applied in usual manner, for example by spraying or spreading the corresponding solution or dispersion, the viscosity of which is adjusted to a degree which ensures uniform coating; that is, to a solids content of generally about 5 to 40% by weight, preferably 10 to 25% by weight. The surface to be coated should be clean, free from fat and especially polymer deposits, and dry, in order to obtain a coating which lasts.

Coating may be carried out in a two-step or single-step process.

In the two-step process, the carrier, for example the anhydride, is applied first in the form of a solution. In the second step, the treatment with a solution of the active substance, optionally with addition of a hardener, is carried out. For the active substance and optionally the hardener, in principle the same solvents may be used as indicated above for the reactive systems and the non-hardening carrier materials, with the exception of the carbonyl compounds, because, on standing, they reduce the efficiency of the active substance. Lower alcohols or ether alcohols, on the other hand, are well suitable, for example methanol, ethanol, propanols, butanols, monomethylglycol ether, monoethylglycol ether, phenoxyethanol.

On prolonged standing, the practically colorless, freshly prepared solutions tend to take on a dark color; however, this does not at all affect their efficiency.

Less complicated than the two-step process is the single-step process preferred in accordance with this invention, which is especially advantageous in the case of epoxide carriers. For, the aprotic solvents required for the anhydrides can be omitted and physiologically tolerable solvents can be used, for example the above alcohols or ether alcohols. Solutions on this basis can be applied particularly easily by spreading or spraying, and they are distinguished by excellent flow and high spread. Despite a sufficient pot life, film formation and hardening occur very rapidly.

After having applied the coating, it is dried and subsequently hardened. Depending on the state the surfaces to be coated are in, it may be advantageous to apply further coatings after drying or even after hardening, in order to ensure a complete covering of all surfaces.

Drying or hardening occurs generally at a temperature of from room temperature to 150° C., depending on the kind of the carrier material and the time of drying and hardening. Of course, elevated temperatures accelerate drying and hardening. In the case of epoxide systems, the temperatures are preferably from 40° to 100° C.; and from 60° to 150° C., especially from 70° to 110° C., in the case of anhydride systems. The heat may be supplied by blowing in correspondingly heated air or other gases, suitable heating devices being arranged in the interior of the reactor, or heating of the reactor walls by means of corresponding cooling or heating systems fixed to them.

The amount of coating mixture applied (active substance and carrier material or reactive system) is not critical in principle. For economic reasons and in order to ensure a good heat transfer, a coating as thin as possible has to be applied, while taking into consideration, however, that a complete covering has to be ensured. Of course, the state the surfaces to be coated, especially the reactor walls, are in has an influence on the necessary amount of coating agent per square meter, so that, in the case of a rough surface, it may be a multiple of that required for an absolutely smooth surface. Depending on the state of the surfaces to be coated, a layer thickness of from 1 to 100μ, preferably from 10 to 50μ, will be sufficient.

The amount of active substance in the coating is advantageously from 0.1 to 100 millimols, preferably 1 to 10 millimols, per square meter of surface; the upper limit being set above all by economic considerations.

Any polymerization vessel for the polymerization of ethylenically unsaturated compounds may be provided with the coating of the invention. Thus, the surfaces to be coated may be of the most different materials, for example of glass, enamel or glaze, or metal. Since generally the most serious problems with respect to polymer deposits arise with the steel reactors, these latter ones are preferably coated with the coating of the invention.

In addition to the inner walls of the polymerization reactor, polymer deposits may form on the so-called inserts, such as agitator devices, flow interruptors (baffle plates), feeding tubes, valves, pumps, ducts, measuring instruments and inside coolers (heat exchangers), so that these devices have to be coated, too, either partially or completely; as well as outside coolers when they are attached directly or indirectly to the polymerization vessel.

In the process for the manufacture of vinyl chloride polymers in accordance with this invention, the polymerization as such is carried out in usual manner, continuously or batchwise, and there may be manufactured vinyl chloride homopolymers, copolymers or graft copolymers, with or without the use of a seed prepolymer etc. The polymerization may be carried out in aqueous dispersion, that is, in emulsion or suspension, in the presence of usual initiators, emulsifiers or suspension stabilizers, and optionally further polymerization auxiliaries.

Suitable initiators used advantageously in amounts of from 0.01 to 3% by weight, preferably 0.1 to 0.3% by weight, relative to the monomers, are for example the following:
diaryl, diacyl peroxides such as diacetyl, acetylbenzoyl, dilauroyl, dibenzoyl, bis-2,4-dichlorobenzoyl, bis-2-methylbenzoyl peroxide; dialkyl peroxides such as di-tert.-butylperoxide; peresters such as tert.-butylpercarbonate, tert.-butylperacetate, tert.-butylperoctoate, tert.-butylperpivalate; dialkylperoxy-dicarbonates such as diisopropyl, diethylhexyl-, dicyclohexyl-, diethylcyclohexyl-peroxydicarbonates; mixed anhydrides of organic sulfoperacids and organic acids such as acetylcyclohexyl-sulfonylperoxide; azo compounds known as polymerization catalysts such as azo-isobutyric acid nitrile; furthermore persulfates such as potassium, sodium or ammonium persulfate; hydrogen peroxide, tert.-butylhydroperoxide or other water-soluble peroxides, as well as corresponding mixtures. Peroxidic catalysts may also be used in the presence of from 0.01 to 1% by weight, relative to the monomers, of one or more reducing substances suitable for forming a redox catalyst system, for example sulfites, bisulfites, dithionites, thiosulfates, aldehyde sulfoxylates, for example formaldehyde-sulfoxylate. Optionally, the polymerization may be carried out in the presence of soluble metal salts, for example of copper, silver, iron or chrome; the amount being advantageously from 0.05 to 10 ppm (on the basis of metal, relative to monomer).

When the polymerization is carried out according to the suspension process, it may be operated in the presence of from 0.01 to 1% by weight, preferably 0.05 to 0.3% by weight, relative to the monomers, of one or more protecting colloids, for example polyvinyl alcohol containing optionally up to 40 mol % of acetyl groups, cellulose derivatives such as water-soluble methyl cellulose, carboxymethyl cellulose, hydroxyethyl cellulose, methylhydroxypropyl cellulose, and gelatin, glue, dextran, or furthermore copolymers of maleic acid or the semiesters thereof and styrenes.

Furthermore, the polymerization may be carried out in the presence of from 0.01 to 5% by weight, relative to monomers, of one or more emulsifiers, the emulsifiers optionally being used in admixture with the above protecting colloids. As emulsifiers, there may be used anionic, amphoteric, cationic or nonionic ones. Examples of anionic emulsifiers are alkali metal salts, alkaline earth metal salts or ammonium salts of fatty acids such as lauric, palmitic or stearic acid; of acidic fatty alcohol-sulfuric acid esters; of paraffinsulfonic acids; of alkylarylsulfonic acids such as dodecylbenzene- or dibutylnaphthalenesulfonic acid; of sulfosuccinic acid dialkyl esters; furthermore the alkali metal salts or ammonium salts of epoxy group containing fatty acids such as epoxystearic acid; of reaction products of peracids, for example peracetic acid with unsaturated fatty acids such as oleic or linoleic acid, or unsaturated oxy-fatty acids such as ricinoleic acid. Examples of amphoteric or cation-active emulsifiers are alkylbetains such as dodecylbetain, alkylpyridinium salts such as laurylpyridinium hydrochloride; furthermore alkylammonium salts such as oxyethyldodecylammonium chloride. Examples of nonionic emulsifiers are partial fatty acid esters of polyols such as glycerol-monostearate, sorbitol-monolaurate, -oleate or -palmitate; polyoxyethylene ethers of fatty alcohols or aromatic hydroxy compounds; polyoxyethylene esters of fatty acids or polypropyleneoxide/polyethylene-oxide condensation products.

Apart from the addition of catalysts, optionally protecting colloids and/or emulsifiers, the polymerization may be carried out in the presence of buffer substances, for example alkali metal acetates, borax, alkali metal carbonates, ammonia or ammonium salts of carboxylic acids; or in the presence of molecule size regulators, for example aliphatic aldehydes having from 2 to 4 carbon atoms, chlorinated or bromated hydrocarbons such as di- and tri-chloroethylene, chloroform, bromoform, methylene chloride, or mercaptans.

The polymerization temperature is generally from 30° to 100° C., the polymerization pressure from 4 to 40 atm/gge. and the pH from 3.5 to 8.

For the copolymerization with vinyl chloride, there are suitable for example one or more of the following monomers: olefins such as ethylene or propylene; vinyl esters of linear or branched carboxylic acids having from 2 to 20, preferably 2 to 4 carbon atoms such as vinyl acetate, vinyl propionate, binyl butyrate, vinyl-2-ethylhexoate; vinyl-isotridecanoic acid esters; vinyl halides such as vinyl fluoride, vinylidene fluoride, vinylidene chloride; vinyl ethers; vinyl pyridine; unsaturated acids such as maleic, fumaric, acrylic, methacrylic acid and the mono- or diesters thereof with mono- or dialcohols having from 1 to 10 carbon atoms; maleic anhydride, maleimide and the N-substitution products thereof with aromatic, cycloaliphatic and aliphatic substituents optionally branched; acrylonitrile; styrene.

For the graft copolymerization, there may be used for example elastomeric polymers obtained by polymerization of one or more of the following monomers: dienes such as butadiene, cyclopentadiene; olefins such as ethylene, propylene; styrene; unsaturated acids such as acrylic or methacrylic acid and the esters thereof with mono- or dialcohols having from 1 to 10 carbon atoms; acrylonitrile; vinyl compounds such as vinyl esters of linear or branched carboxylic acids having from 2 to 20, preferably 2 to 4 carbon atoms; vinyl halides such as vinyl chloride or vinylidene chloride.

After the polymerization, there may be added further substances for stabilizing and improving the processing properties to the polymers obtained in the form of aqueous dispersions. Subsequently, the dry polymer is prepared according to the usual methods of work-up.

The copolymers or graft copolymers obtainable according to this invention contain at least 50% by weight, preferably at least 80% by weight, of polymerized vinyl chloride units.

The process of the invention is preferably suitable for the polymerization in aqueous suspension with the use of oil-soluble initiators and with addition of at least one protecting colloid (suspension stabilizer), and especially for the manufacture of vinyl chloride homopolymers. On the other hand, the process of the invention is advantageous also for the polymerization of vinyl chloride in solution, in the mass or in the gaseous phase, as well as for the polymerization of other monomers than vinyl chloride.

The process of the invention allows the manufacture of many polymer batches over prolonged periods and without troublesome formation of deposits on the walls and inserts of the reactor, thus ensuring a constantly good heat transfer to the walls of the vessel, which transfer is practically not affected by the thin layer of coating, and therefore a uniform quality of the product is the result. Time-consuming, capacity-reducing wall cleaning operations are no longer required, furthermore a hitherto inevitably frequent opening of the reactor involving the noxious vinyl chloride emissions is avoided. In the case of continuous polymerization, the periods until operations have to be stopped can be prolonged by a multiple.

The process of the invention is nearly not critical as to changes in formulation and/or operation mode, and it furnishes a product the processing properties of which are not adversely affected, as this is often the case in hitherto known processes. A further advantage of the process of the invention resides in the fact that it may be used also in old-time reactors having very rough walls which incite heavy deposit formation, because the coating of the invention efficiently suppresses the germinating function of the wall pores, especially when reactive systems are used as carrier materials, which allow furthermore to obtain coatings having a particularly good adhesion and durability, and a good deposit-preventing activity, especially in the case of vinyl chloride copolymerization.

The following examples illustrate the invention, for which examples the following solutions were used:

SOLUTION SERIES A

A 1:1 copolymer of maleic anhydride and methylvinyl ether ($\eta$ spec. [cp] 0.5, 1 g/100 ml butan-2-one, 25° C.) was used as basis. The following solutions were used:

A 1: 7.5 g copolymer per 100 ml each of diglycol dimethyl ether
A 2: 10 g copolymer per 100 ml each of 1,3-dioxolan
A 3: 10 g copolymer per 100 ml each of acetone
A 4: 15 g copolymer per 100 ml each of acetone

SOLUTION SERIES B

A 1:1 copolymer of maleic anhydide and ethyl acetate, mean polymerization degree 250, was used as basis. The following solutions were employed:

B 1: 7.5 g copolymer per 100 ml each of diglycol dimethyl ether
B 2: 10 g copolymer per 100 ml each of 1,3-dioxolan

SOLUTION SERIES C

Bisphenol A/diglycidyl ether was used as basis. The following solutions were employed:

C 1: 15 g substance per 100 ml each of acetone
C 2: 20 g substance per 100 ml each of glycolmonomethyl ether
C 3: 50 g substance per 100 ml each of glycolmonoethyl ether

SOLUTION SERIES D

A mixed epoxide of bisphenol A, diglycidyl ether and vinylcyclohexene-diepoxide, epoxy equivalent 125, was used as basis. The following solutions were employed:

D 1: 20 g substance per 100 ml each of glycolmonomethyl ether
D 2: 30 g substance per 100 ml each of glycolmonomethyl ether

SOLUTIONS SERIES E

A Mannich base of phenol, formaldehyde and xylylene diamine was used as basis. The following solution was employed:

E 1: 8 g substance per 100 ml each of glycolmonomethyl ether

SOLUTION SERIES F

A Mannich base of phenol, formaldehyde and diethylene triamine was used as basis. The following solution was employed:

F 1: 12.6 g substance per 100 ml each of glycolmonomethyl ether

SOLUTION SERIES G

A Mannich base of 3 mols formaldehyde, 3 mols dimethylamine and 1 mol phenol was used as basis. The following solution was employed:

G 1: 4 g substance per 100 ml each of glycolmonomethyl ether

SOLUTION SERIES H

The compound of the formula

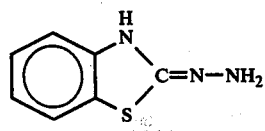

was used as active substance. The following solutions were employed:
- H 1: 3 g substance per 100 ml each of glycol-monomethyl ether
- H 2: 5 g substance per 100 ml each of glycol-monomethyl ether
- H 3: 10 g substance per 100 ml each of glycol-monomethyl ether

SOLUTION SERIES I

The compound of the formula

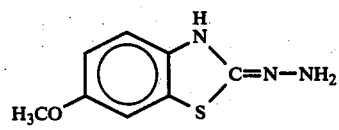

was used as active substance. The following solutions were employed:
- I 1: 3 g substance per 100 ml each of glycol-monomethyl ether
- I 2: 3 g substance per 100 ml each of glycolmonoethyl ether

SOLUTION SERIES K

The compound of the formula

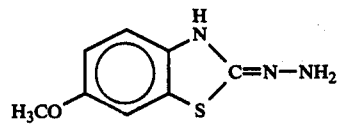

was used as active substance. The following solutions were employed:
- K 1: 3 g substance per 100 ml each of glycol-monomethyl ether
- K 2: 3 g substance per 100 ml each of glycolmonoethyl ether

SOLUTION SERIES L

The compound of the formula

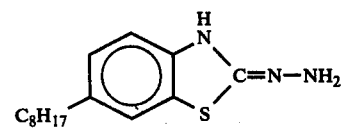

was used as active substance. The following solutions was employed:
- L 1: 4 g substance per 100 ml each of methylglycol

SOLUTION SERIES M

The compound of the formula

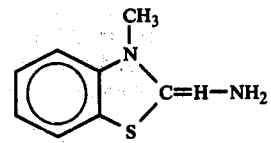

was used as active substance. The following solutions were employed:
- M 1: 1 g substance per 100 ml each of methanol
- M 2: 1 g substance per 100 ml each of glycoldimethyl ether
- M 3: 1 g substance per 100 ml each of 1,3-dioxolan
- M 4: 3 g substance per 100 ml each of glycol-monomethyl ether

SOLUTION SERIES N

The compound of the formula

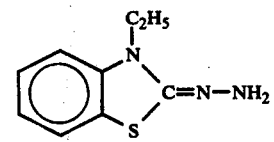

was used as active substance. The following solutions were employed:
- N 1: 3 g substance per 100 ml each of glycol-monomethyl ether
- N 2: 3 g substance per 100 ml each of glycolmonoethyl ether

SOLUTION SERIES O

The compound of the formula

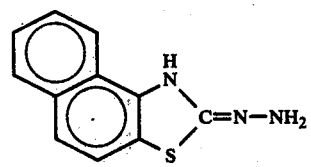

was used as active substance. The following solutions were employed:
- O 1: 4 g substance per 100 ml each of glycol-monomethyl ether
- O 2: 4 g substance per 100 ml each of glycolmonoethyl ether

EXAMPLES 1 to 36

For these Examples, naturally smooth sheet iron strips made from stainless steel 1.4404 having dimensions of 170×35×2 mm were used. Before coating, the strips were carefully freed from fat by means of methylene chloride and, after drying, coated on one side as described below. The strips so prepared were clamped and screwed by means of a stainless steel collar to the inner wall of a 4000 liter reactor made from stainless steel 1.4541 and provided with an agitator in such a manner that the coated face of the strips was directed to the interior and the uncoated face to the wall of the reactor.

After 220 liters of deionized water containing 300 g of partially saponified polyvinyl acetate (22% residual acetyl content, viscosity [Hoppler] 5 cp [4% solution in water at 20° C.]) were introduced, the vessel was closed. After the air had been driven out, 100 kg of vinyl chloride were charged, and 75 g of a 40% solution of diisopropyl-percarbonate in dibutyl phthalate was added. The reactor was heated to 53° C. with agitation and this temperature was maintained until the pressure had dropped to 4.0 atm/gge. In order to examine one coating, three identical polymerization batches were operated one after the other without replacing the test specimens. Subsequently, the strips were removed from the reactor. The edges and the uncoated surfaces were carefully freed from adhering deposits; after drying, the weight increase of the coated faces was determined and calculated in mg/dm$^2$. For a comparison, the weight increase of an analogous surface of an uncoated specimen was determined, and a blank value of 2675 mg/dm$^2$ of deposit was found.

EXAMPLES 1 to 30

The specimens were coated on one side with a mixture of identical parts by weight of the solutions as indicated which mixture was freshly prepared. After drying in air, the strips were hardened under the conditions as indicated. Subsequently, the test was carried out as indicated, and the weight increase of the coated surface was determined in mg/dm$^2$.

After predrying in air, hardening was carried out as indicated. The further treatment was carried out as in the single-step process.

| Example No. | Coat I | Coat II | Hardening min | Hardening ° C. | Weight increase mg/dm$^2$ | Remarks |
|---|---|---|---|---|---|---|
| 31 | C 1 | H 3 | 60 | 100 | 0.5 | |
| 32 | A 2 | M 3 | 60 | 100 | 38 | |
| 33 | B 2 | M 3 | 60 | 100 | 40 | |
| 34 | B 1 | M 1 | 60 | 100 | 43 | |
| 35 | A 4 | M 4 | 66 | 100 | 6 | |
| 36 | A 4 | M 1 | 60 | 100 | 4 | |

EXAMPLE 37

The complete inner surface, free from deposits and dry, of a 400 liter stainless steel reactor (including agitator), that is, about 3 m$^2$, was spray-coated with 150 ml of coating material (= mixture according to Example 13), and subsequently hardened for 15 minutes at a temperature of 50° C. After having introduced 200 liters of deionized water containing 90 g of partially saponified polyvinyl acetate and 60 g of methylhydroxypropyl cellulose in dissolved form, the reactor was closed. After having driven out the air, 100 kg of vinyl chloride

| Example No. | Coating mixture | Hardening min. | Hardening ° C. | mg/dm$^2$ | Remarks |
|---|---|---|---|---|---|
| 1 | without* | — | — | 2 675 | Comparative sample without coating |
| 2 | C 2 + G 1* | 30 | 50 | 18 260 | Comparative sample with carrier substance without active substance |
| 3 | D 1 + G 1* | 30 | 50 | 22 140 | " |
| 4 | C 2 + E 1* | 30 | 50 | 24 150 | " |
| 5 | C 1 + F 1* | 30 | 50 | 34 100 | " |
| 6 | C 3 + E 1* | 30 | 50 | 2 520 | " |
| 7 | C 2 + E 1 + G 1* | 30 | 50 | 2 380 | " |
| 8 | C 2 + E 1 + X* | 15 | 50 | 2 580 | X = solution of 3 g benzothiazol-2-one in 100 ml glycolmonomethyl ether The carbonyl compound is therefore inactive. |
| 9 | C 2 + E 1 + Y* | 10 | 50 | 2 465 | Y = solution of 3 g 3-imino-benzothiazole in 100 ml of glycol-monomethyl ether. The imino compound is therefore inactive. |
| 10 | C 2 + E 1 + H 1 | 15 | 50 | 11 | Mixture was used after 50 h standing at 20° C. |
| 11 | C 2 + E 1 + H 2 | 30 | 50 | 34 | |
| 12 | C 2 + H 2 | 15 | 50 | 62 | sufficient activity even without hardener, when carrier/active substance ratio less extreme |
| 13 | C 2 + E 1 + H 1 | 15 | 50 | 23 | |
| 14 | C 2 + E 1 + H 2 | 15 | 50 | 28 | |
| 15 | C 2 + E 1 + I 1 | 30 | 50 | 6.5 | |
| 16 | C 2 + E 1 + I 2 | 30 | 50 | 19 | |
| 17 | A 3 + M 1 | 60 | 100 | 14 | |
| 18 | B 1 + M 2 | 60 | 150 | 26 | |
| 19 | A 1 + M 2 | 60 | 100 | 8 | |
| 20 | A 4 + M 1 | 60 | 100 | 21 | |
| 21 | C 2 + E 1 + K 1 | 15 | 50 | 10,5 | |
| 22 | D 2 + F 1 + K 2 | 15 | 50 | 103 | |
| 23 | C 2 + E 1 + L 1 | 15 | 50 | 28 | |
| 24 | C 2 + E 1 + L 1 | 15 | 50 | 31 | |
| 25 | C 2 + E 1 + N 1 | 15 | 50 | 19,5 | |
| 26 | C 2 + E 1 + N 2 | 15 | 50 | 23 | |
| 27 | C 2 + E 1 + O 1 | 15 | 50 | 3,5 | |
| 28 | C 2 + E 1 + O 2 | 15 | 50 | 3,8 | |
| 29 | C 3 + H 2 | 15 | 50 | 1 985 | Extreme excess of epoxide and simultaneous ommission of hardener |
| 30 | D 1 + H 2 | 15 | 50 | 94 | sufficient activity even without hardener, when carrier/active substance ratio less extreme |

*Comparative tests

EXAMPLES 31 to 36

Two-step Process

A first coat of the solutions as indicated was applied to the strips on one side, and after its drying, a second coat was applied using the corresponding solutions.

were charged, and activator solutions of 53 kg of di-2-ethylhexyl-peroxidicarbonate (40% in aliphatic substance) and 27 g of tert.-butyl-perpivalate (75% in aliphatic substance) were added. The reactor was heated to 53° C. with agitation, and the temperature was maintained until the pressure had dropped to 4.5 atm/gge. After termination of the test, the reaction mixture was cooled, the polymerization vessel was depressurized and discharged. After rinsing with water, the reactor was dried and examined.

In this manner, 5 batches one after the other were operated, and the vessel was coated again before each batch.

After 5 batches, the vessel including dome area and inserts was completely clean and bright.

EXAMPLE 38

The complete inner surface, free from deposits and dry, of a 10 liter reactor, including agitator, was coated with coating material according to Example 13, and subsequently hardened for 15 minutes at 50° C. After having introduced 6 l. of deionized water containing 4.5 g of methylhydroxypropyl cellulose in dissolved form, the reactor was closed, and after having driven out the air, charged with 2.7 kg of vinyl chloride and 300 g of vinyl acetate, and 3 g of di-2-ethylhexyl-peroxydicarbonate were added. The reactor was heated to 61° C. with agitation, and the temperature was maintained until the pressure had dropped to 4.0 atm/gge. After termination of the test, the reaction mixture was cooled, the reactor was depressurized and discharged. After rinsing with water, the reactor was dried and examined. After having manufactured 5 polymerization batches in this manner, (the reactor was coated again before each batch), the vessel including dome area and inserts was free from deposits.

EXAMPLE 39

The complete inner surface, free from deposits and dry, of a 400 liter stainless steel reactor (including agitator), that is about 3 m², was spray-coated in water-moist state at normal temperature (preliminary drying not being necessary since practically without influence on the activity) with 2000 ml of the ready-for-use solution containing 21 parts by weight of benzothiazol-2-one-hydrazone
4500 parts by weight of methanol
4000 parts by weight of water
10 parts by weight of partially saponified polyvinyl alcohol.

Subsequently, after-treatment was carried out with the same amount of deionized water, and subsequently, the liquid collected on the bottom of the reactor was removed. After having introduced 200 liters of deionized water containing 90 g of partially saponified polyvinyl acetate and 60 g of methylhydroxypropyl cellulose in dissolved form, the reactor was closed. After having driven out the air, 100 kg of vinyl chloride were charged, and activator solutions of 53 g of di-2-ethylhexylperoxydicarbonate (40% in aliphatic substances) and 27 g of tert.-butylperpivalate (75% in aliphatic substance) were added. The reactor was heated to 53° C. with agitation and the temperature was maintained until the pressure had dropped to 4.0 atm/gge. After termination of the test, the reation mixture was cooled, the polymerization vessel depressurized and discharged. After rinsing with water, the reactor was examined.

In this manner, 10 batches were manufactured one after the other, and before each batch, the vessel was again coated with deposit-preventing material. After 3 batches, the vessel was completely clean and bright, after 5 batches a few dull spots were found which, however, had nearly fully vanished after 10 batches.

What is claimed is:

1. A process for the manufacture of vinyl chloride homopolymers, copolymers or graft polymers containing at least 50% by weight of polymerized vinyl chloride units by polymerization of the monomer or the monomer mixture in aqueous dispersion in the presence of radical-forming catalysts, optionally suspension stabilizers, emulsifiers and further polymerization auxiliaries, which comprises carrying out the polymerization in a reactor the inner walls of which and other parts where polymer deposits may form are coated entirely or partially with a coating containing a compound of the formula

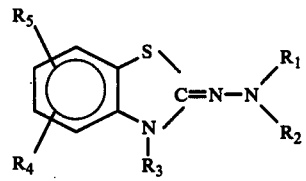

in which
$R_1$ is hydrogen, an organic hydrocarbon radical having from 1 to 12 carbon atoms, or acyl having from 2 to 8 carbon atoms,
$R_2$ is $R_1$ or
$R_2$ and $R_1$ together are alkylidene of 1 to 6 carbon atoms or aralkylidene of 7 to 10 carbon atoms,
$R_3$ is hydrogen or an organic hydrocarbon radical having from 1 to 12 carbon atoms; at least one of the radicals $R_1$, $R_2$ or $R_3$ being hydrogen,
$R_4$ is $R_3$; furthermore an organic hydrocarbonoxy radical having from 1 to 12 carbon atoms, hydroxyl, halogen, amino, (di)alkylamino having from 1 to 12 carbon atoms, carboxyl, sulfoxyl (= $SO_3H$);
$R_5$ is $R_4$; or
$R_4$ and $R_5$ together are an aromatic ring.

2. The process as claimed in claim 1, wherein $R_1$, $R_2$ and $R_3$ are hydrogen or an alkyl radical having from 1 to 6 carbon atoms.

3. The process as claimed in claim 1, wherein $R_1$, $R_2$ and $R_3$ are hydrogen.

4. The process as claimed in claims 1, wherein $R_4$ and $R_5$ are hydrogen or an alkoxy radical having from 1 to 6 carbon atoms.

5. The process as claimed in claims 1, wherein $R_4$ and $R_5$ together are a benzene nucleus.

6. The process as claimed in claims 1, wherein the active substance is fixed on the coated surfaces by means of a film-forming carrier material.

7. The process as claimed in claim 6, wherein the film-forming material is cross-linked.

* * * * *